United States Patent
Cho

(10) Patent No.: US 9,223,402 B2
(45) Date of Patent: Dec. 29, 2015

(54) HEAD MOUNTED DISPLAY AND METHOD OF CONTROLLING DIGITAL DEVICE USING THE SAME

(71) Applicant: LG ELECTRONICS INC., Seoul (KR)

(72) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 13/662,033

(22) Filed: Oct. 26, 2012

(65) Prior Publication Data

US 2014/0062854 A1 Mar. 6, 2014

(30) Foreign Application Priority Data

Aug. 31, 2012 (KR) .................. 10-2012-0096132

(51) Int. Cl.
*G06F 3/01* (2006.01)

(52) U.S. Cl.
CPC ............ *G06F 3/016* (2013.01); *G06F 3/017* (2013.01)

(58) Field of Classification Search
CPC ...................................................... G06F 3/017
USPC ................. 345/7–9, 156–158; 715/863–866
See application file for complete search history.

(56) References Cited

U.S. PATENT DOCUMENTS

| | | | |
|---|---|---|---|
| 7,565,295 B1 | 7/2009 | Hernandez-Rebollar | |
| 8,253,685 B2 | 8/2012 | Katayama | |
| 2006/0197832 A1 | 9/2006 | Yamada et al. | |
| 2010/0066821 A1* | 3/2010 | Rosener et al. | 348/77 |
| 2011/0234384 A1 | 9/2011 | Agrawal | |
| 2012/0050275 A1 | 3/2012 | Matsui et al. | |
| 2012/0235900 A1* | 9/2012 | Border et al. | 345/156 |
| 2012/0287284 A1* | 11/2012 | Jacobsen et al. | 348/158 |
| 2012/0302289 A1* | 11/2012 | Kang | 455/557 |
| 2012/0320169 A1* | 12/2012 | Bathiche | 348/53 |

FOREIGN PATENT DOCUMENTS

| | | |
|---|---|---|
| JP | 2011-180867 A | 9/2011 |
| JP | 2012-48659 A | 3/2012 |
| KR | 10-2011-0080915 A | 7/2011 |

* cited by examiner

*Primary Examiner* — Dennis Joseph
(74) *Attorney, Agent, or Firm* — Birch, Stewart, Kolasch & Birch, LLP

(57) ABSTRACT

Disclosed is a method of receiving a gesture input of a user using a Head Mounted Display (HMD) and synthetically controlling a digital device using the received gesture input. The method includes detecting whether or not the HMD is worn by a user, detecting a positional state of an external digital device linked with the HMD, the positional state including a first state in which the external digital device is located in a preset view angle region of the HMD and a second state in which the external digital device is not located in the view angle region, detecting a gesture input of the user, determining at least one digital device to be controlled based on whether or not the HMD is worn by the user and the detected positional state, and controlling a display object of the determined digital device under application of the gesture input.

26 Claims, 12 Drawing Sheets

HEAD MOUNTED DISPLAY AND METHOD OF CONTROLLING DIGITAL DEVICE USING THE SAME

This application claims the benefit of Korean Patent Application No. 10-2012-0096132, filed on Aug. 31, 2012, which is hereby incorporated by reference as if fully set forth herein.

BACKGROUND OF THE INVENTION

1. Field of the Invention

The present invention relates to a head mounted display and a method of controlling a digital device using the same. More particularly, the present invention relates to a method of receiving a gesture input of a user using a head mounted display and synthetically controlling a digital device using the received gesture input.

2. Discussion of the Related Art

A Head Mounted Display (HMD) refers to a variety of image display devices that are worn on the head of a user like glasses, to assist the user in viewing an image. With the tendency of a smaller weight and size of digital devices, various types of wearable computers have been developed, and the HMD has also been widely used. The HMD may provide the user with various conveniences in combination with augmented reality techniques, N-screen techniques, and the like over a simple display function.

The HMD is available in association with various digital devices. In particular, there is a demand for a method of synthetically controlling each device with a diversification in the kinds of user available digital devices.

SUMMARY OF THE INVENTION

Accordingly, the present invention is directed to a head mounted display and a method of controlling a digital device using the same that substantially obviate one or more problems due to limitations and disadvantages of the related art.

One object of the present invention is to provide a method of synthetically controlling various digital devices using an HMD.

Another object of the present invention is to provide a method of controlling at least one of display objects of an HMD and an external digital device using a user gesture input detected via the HMD.

A further object of the present invention is to provide a method of grasping a user's intention in that a user who performs a gesture input wishes to control display of any one digital device, and controlling a display object of the corresponding digital device to conform to the user's intention.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of a digital device using a Head Mounted Display (HMD) includes detecting whether or not the HMD is worn by a user, detecting a positional state of an external digital device linked with the HMD, wherein the positional state includes a first state in which the external digital device is located in a preset view angle region of the HMD and a second state in which the external digital device is not located in the view angle region of the HMD, detecting a gesture input of the user, determining at least one digital device, display of which will be controlled, under application of the gesture input, based on whether or not the HMD is worn by the user and based on the detected positional state of the external digital device, wherein the at least one digital device includes at least one of the HMD and the external digital device, and controlling a display object of the determined digital device under application of the gesture input.

In accordance with another aspect of the present invention, a Head Mounted Display (HMD) includes a processor configured to control operation of the HMD, a display unit configured to output an image based on a command of the processor, a sensor unit configured to sense a peripheral environment of the HMD and transmit the sensed result to the processor, and a communication unit configured to perform data transmission/reception with an external digital device based on a command of the processor, wherein the processor is configured to detect whether or not the HMD is worn by a user, to detect a positional state of the external digital device linked with the HMD, wherein the positional state includes a first state in which the external digital device is located in a preset view angle region of the HMD and a second state in which the external digital device is not located in the view angle region of the HMD, to detect a gesture input of the user, to determine at least one digital device, display of which will be controlled, under application of the gesture input, based on whether or not the HMD is worn by the user and based on the detected positional state of the external digital device, wherein the at least one digital device includes at least one of the HMD and the external digital device, and to control a display object of the determined digital device under application of the gesture input.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, exemplary embodiments of the present invention will be described in detail with reference to the attached drawings.

Although the terms used in the following description are selected, as much as possible, from general terms that are widely used at present while taking into consideration the functions obtained in accordance with the present invention, these terms may be replaced by other terms based on intensions of those skilled in the art, customs, emergence of new technologies, or the like. Also, in a particular case, terms that are arbitrarily selected by the applicant of the present invention may be used. In this case, the meanings of these terms may be described in corresponding description parts of the invention. Accordingly, it should be noted that the terms used herein should be construed based on practical meanings thereof and the whole content of this specification, rather than being simply construed based on names of the terms.

Figure 1:
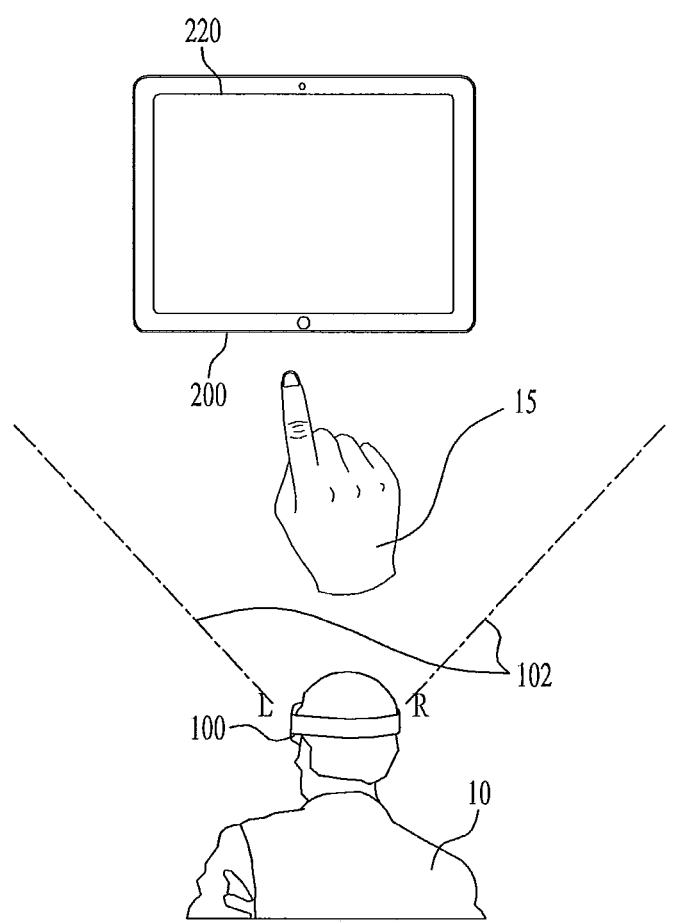
FIG. 1 is a view illustrating an HMD, a user who wears the HMD, and a digital device linked with the HMD according to an embodiment of the present invention.

FIG. 1 is a view illustrating an HMD 100, a user 10 who wears the HMD 100, and an external digital device 200 linked with the HMD 100 according to an embodiment of the present invention.

In FIG. 1, the HMD 10 may output various content, and may be operated in linkage with at least one external digital device 200. In this case, the HMD 100 may perform separate pairing or communication connection for linkage with the external digital device 200. Pairing or communication connection may be performed by a user input through the external digital device 200 or the HMD 100. For example, the HMD 100 may provide a separate user interface for pairing or communication connection with the external digital device 200, and a user can perform a user input using the user interface so as to achieve pairing or communication connection between the HMD 100 and the external digital device 200.

The HMD 100 may display at least one object through a display unit equipped therein. For example, the HMD 100 may display internal content and a user interface. Additionally, the HMD 100 may display various content of the external digital device 200 linked with the HMD 100.

The external digital device 200 may output various kinds of content. For example, the external digital device 200 may output multimedia content, such as live broadcasts, movies, music, dramas, web-pages, games, and applications. The external digital device 200 may include at least one display unit 220, and the content output from the external digital device 200 may be displayed on the display unit 220. The external digital device 200 may further include a communication unit (not shown), and may perform data transmission/reception with the HMD 100 and other external devices through the communication unit. In the present invention, the external digital device 200 includes a variety of digital devices including the display unit 220 and the communication unit. For example, the external digital device 200 includes a variety of digital devices, such as a Personal Computer (PC), Personal Digital Assistant (PDA), laptop computer, tablet PC, television, etc., that are capable of displaying an image and of performing data communication.

The HMD 100 and the external digital device 200 are capable of performing data transmission/reception using various types of wireless or wired communication means. In this case, available wireless communication means include Near Field Communication (NFC), ZigBee, infrared communication, Bluetooth, Wi-Fi communication, etc., but the present invention is not limited thereto. In the present invention, communication between the HMD 100 and the external digital device 200 may be accomplished using any one of the above enumerated communication means, or may be accomplished using combinations thereof.

The HMD 100 of the present invention may include a view angle region 102 within a preset range. The view angle region 102 is a preset region corresponding to a visual field of the user 10 who wears the HMD 100, and may include a region forward of the HMD 100 within a predetermined angular range. According to an embodiment of the present invention, the HMD 100 may detect whether or not the external digital device 200 linked with the HMD 100 is located in the view angle region 102 of the HMD 100. That is, the HMD 100 may detect a positional state of the external digital device 200 linked with the HMD 100. In the present invention, the positional state may include a first state in which the external digital device 200 is located in the view angle region 102 of the HMD 100, and a second state in which the external digital device 200 is not located in the view angle region 102 of the HMD 100.

The HMD 100 may detect a gesture input 15 of the user 10. The gesture input 15 includes an input in which the hand or the finger of the user 10 moves from a first position to a second position. However, it will be appreciated that the present invention is not limited thereto and the gesture input 15 includes various user inputs to control content of the external digital device 200. The HMD 100 of the present invention may further detect pointing direction information of the gesture input 15. In the present invention, the pointing direction information of the gesture input 15 indicates which digital device the user wishes to control using the corresponding gesture input 15. According to an embodiment of the present invention, the pointing direction information of the gesture input 15 may be derived from the direction indicated by the finger included in the gesture input 15. For example, if the finger included in the gesture input 15, as illustrated in FIG. 1, points the external digital device 200, the pointing direction information of the corresponding gesture input 15 may indicate the external digital device 200. In addition, if the finger included in the gesture input 15 points the HMD 100, the pointing direction information of the corresponding gesture input 15 may indicate the HMD 100. However, it will be appreciated that a method of determining the pointing direction information of the gesture input 15 is not limited to the above description, and the method may be altered to various embodiments. For example, the pointing direction information may be differently determined according to a preset motion included in the gesture input 15 (for example, a motion of spreading a specific finger).

The HMD 100 may further detect whether or not the HMD 100 is worn by the user 10. That is, the HMD 100 may detect whether or not the user 10 wears the corresponding HMD 100 using the sensor unit equipped in the HMD 100. In the present invention, the HMD 100 may control a digital device corresponding to the gesture input 15 of the user 10 using the above described detected conditions. More specifically, the HMD 100 may determine a digital device, display of which will be controlled via the gesture input 15, based on whether or not the user 100 wears the HMD 100 and based on the positional state of the external digital device 200. In this case, the digital device, display of which will be controlled, may include at least one of the HMD 100 and the external digital device 200. A detailed embodiment thereof will be described with reference to FIGS. 2 to 10.

Figure 2:
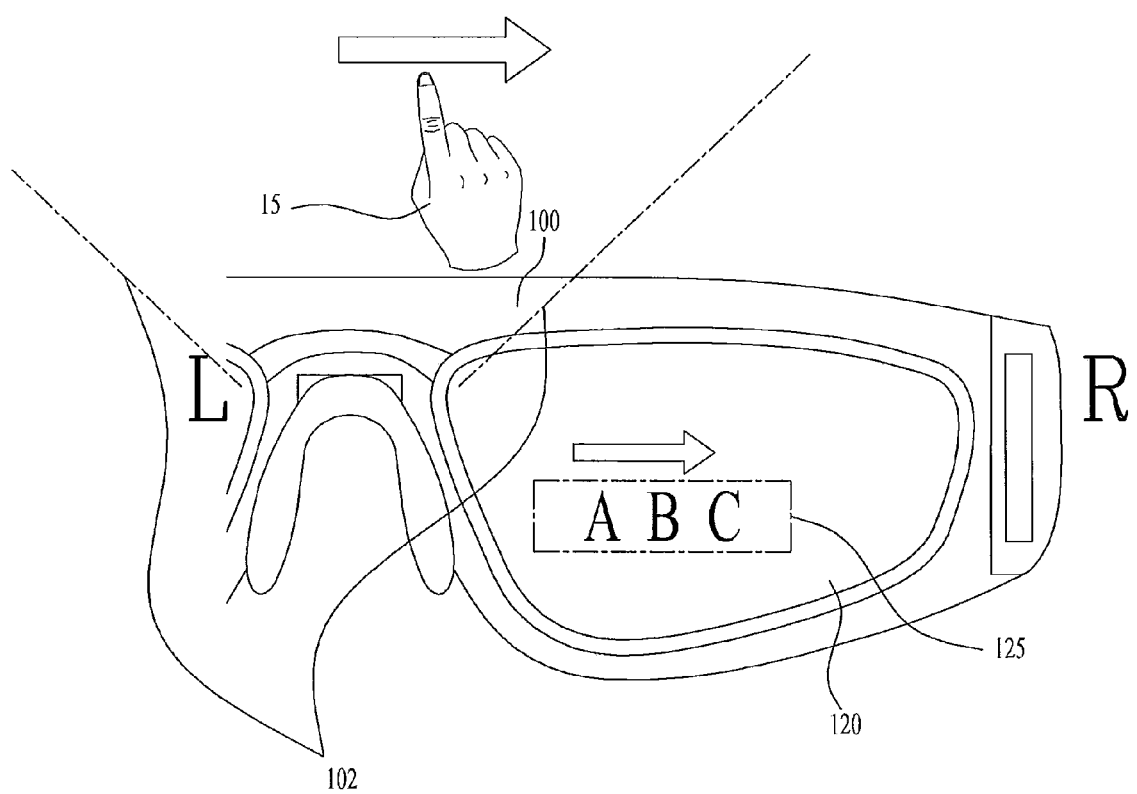
FIG. 2 is a view illustrating a control method of a digital device according to a first embodiment of the present invention.

FIG. 2 is a view illustrating a control method of a digital device according to one embodiment of the present invention. In the embodiment of FIG. 2, the HMD 100 is worn by the user, and an external digital device linked with the HMD 100 is located at the outside of the view angle region 102 of the HMD 100.

First, the HMD 100 of the present invention detects the gesture input 15 of the user 10. Next, the HMD 100 controls a display object 125 of the HMD 100 using the detected gesture input 15 of the user. For example, in FIG. 2, the HMD 100 may detect the gesture input 15 that moves from the left side L of the HMD 100 to the right side R of the HMD 100 within the view angle region 102. The HMD 100 may control the display object 125 output on the display unit 120 of the HMD 100 under application of the detected gesture input 15. That is, the HMD 100 may apply an input for movement from the left side to the right side to the display object 125. In this case, the display object 125 controlled by the gesture input 15 may be at least one of various content and a user interface displayed on the display unit 120 of the HMD 100.

Meanwhile, according to the embodiment of the present invention, the HMD 100 may determine whether or not the external digital device linked with the HMD 100 provides the same display object as the display object 125 of the HMD 100. That is, the HMD 100 determines whether or not the external digital device is in an N-screen state in which the external digital device outputs a display object equal to the display object 125 of the HMD 100. If the external digital device provides the same display object as the display object 125 of the HMD 100, the display object of the external digital device may be controlled along with the display object 125 of the HMD 100. That is, the HMD 100 controls the display object of the external digital device and the display object 125 of the HMD 100 together under application of the detected gesture input 15. In this case, the display object of the external digital device controlled by the HMD 100 may be equal to the display object 125 output from the HMD 100. However, if the external digital device does not provide the same display object as the display object 125 of the HMD 100 or if no external digital device is linked with the HMD 100, the HMD 100 may control only the display object 125 of the HMD 100 under application of the gesture input 15.

Figure 3:
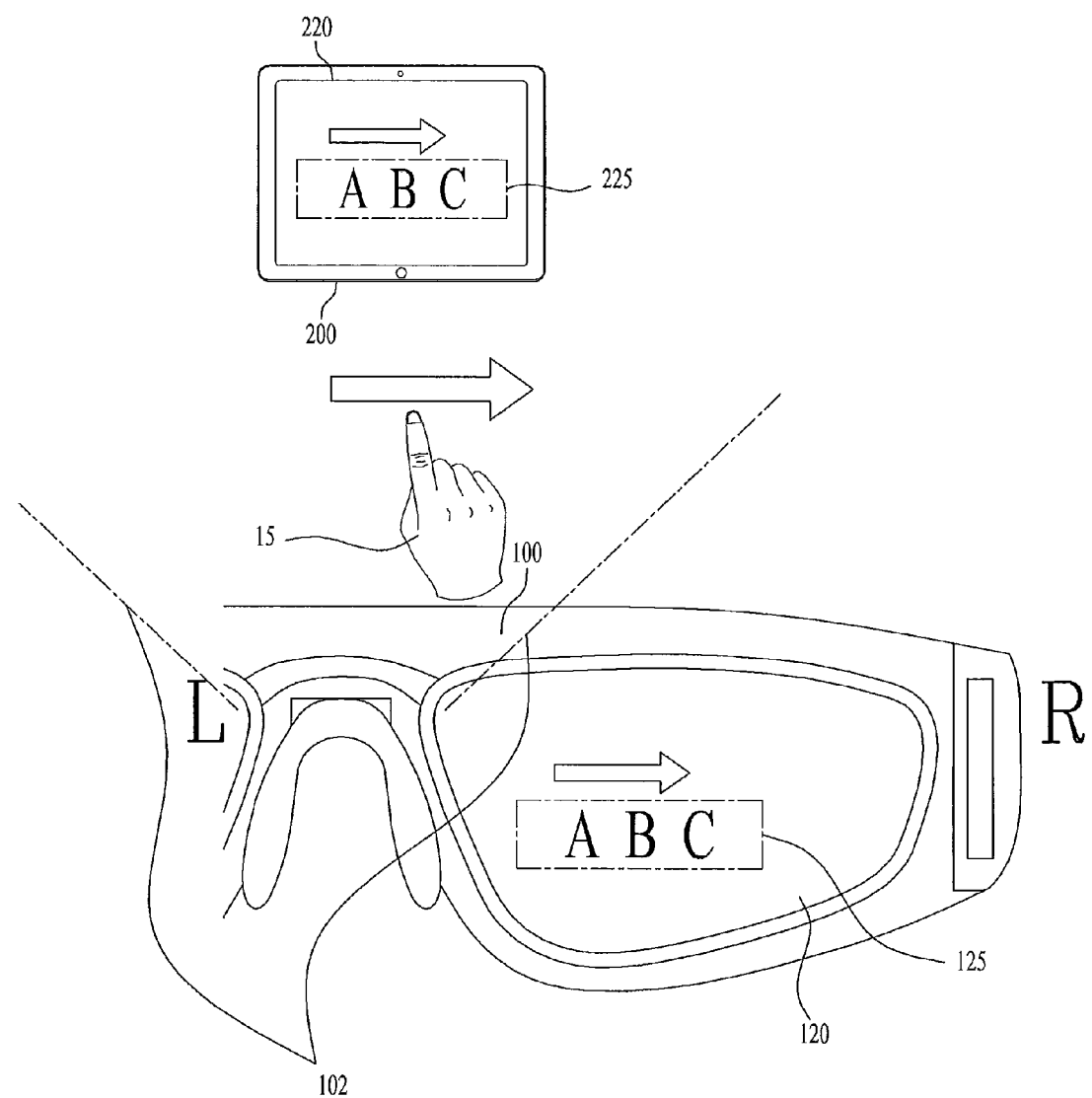
FIG. 3 is a view illustrating a control method of a digital device according to a second embodiment of the present invention.

FIG. 3 is a view illustrating a control method of a digital device according to another embodiment of the present invention. In the embodiment of FIG. 3, the HMD 100 is worn by the user 10, and the external digital device 200 linked with the HMD 100 is located within the view angle region 102 of the HMD 100.

First, the HMD 100 of the present invention detects the gesture input 15 of the user 10. Next, the HMD 100 may determine whether or not the external digital device 200 linked with the HMD 100 provides the same display object as the display object 125 of the HMD 100. That is, the HMD 100 determines whether or not the external digital device 200 is in an N-screen state in which the external digital device 200 provides a display object equal to the display object 125 of the HMD 100. Like the embodiment of FIG. 3, if the external digital device 200 provides the same display object as the display object 125 of the HMD 100, a display object 225 of the external digital device 200 may be controlled along with the display object 125 of the HMD 100. That is, the HMD 100 controls the display object 225 of the external digital device 200 and the display object 125 of the HMD 100 together under application of the detected gesture input 15. In this case, the display object 225 of the external digital device 200 controlled by the HMD 100 may be equal to the display object 125 output from the HMD 100.

The HMD 100 controls the display object 225 of the external digital device 200 and the display object 125 of the HMD 100 together using the detected gesture input 15 of the user. For example, in FIG. 3, the HMD 100 may detect the gesture input 15 that moves from the left side L of the HMD 100 to the right side R of the HMD 100 within the view angle region 102. The HMD 100 may control the display object 125 output on the display unit 120 of the HMD 100 and the display object 225 output on the display unit 220 of the external digital device 200 under application of the detected gesture input 15. That is, the HMD 100 may apply an input for movement from the left side to the right side with respect to the display object 125 and the display object 225. In this case, the display object 125 and the display object 225, which are controlled based on the gesture input 15, may be at least one of various content and user interfaces displayed respectively on the display unit 120 of the HMD 100 and the display unit 220 of the external digital device 200.

Figure 4:
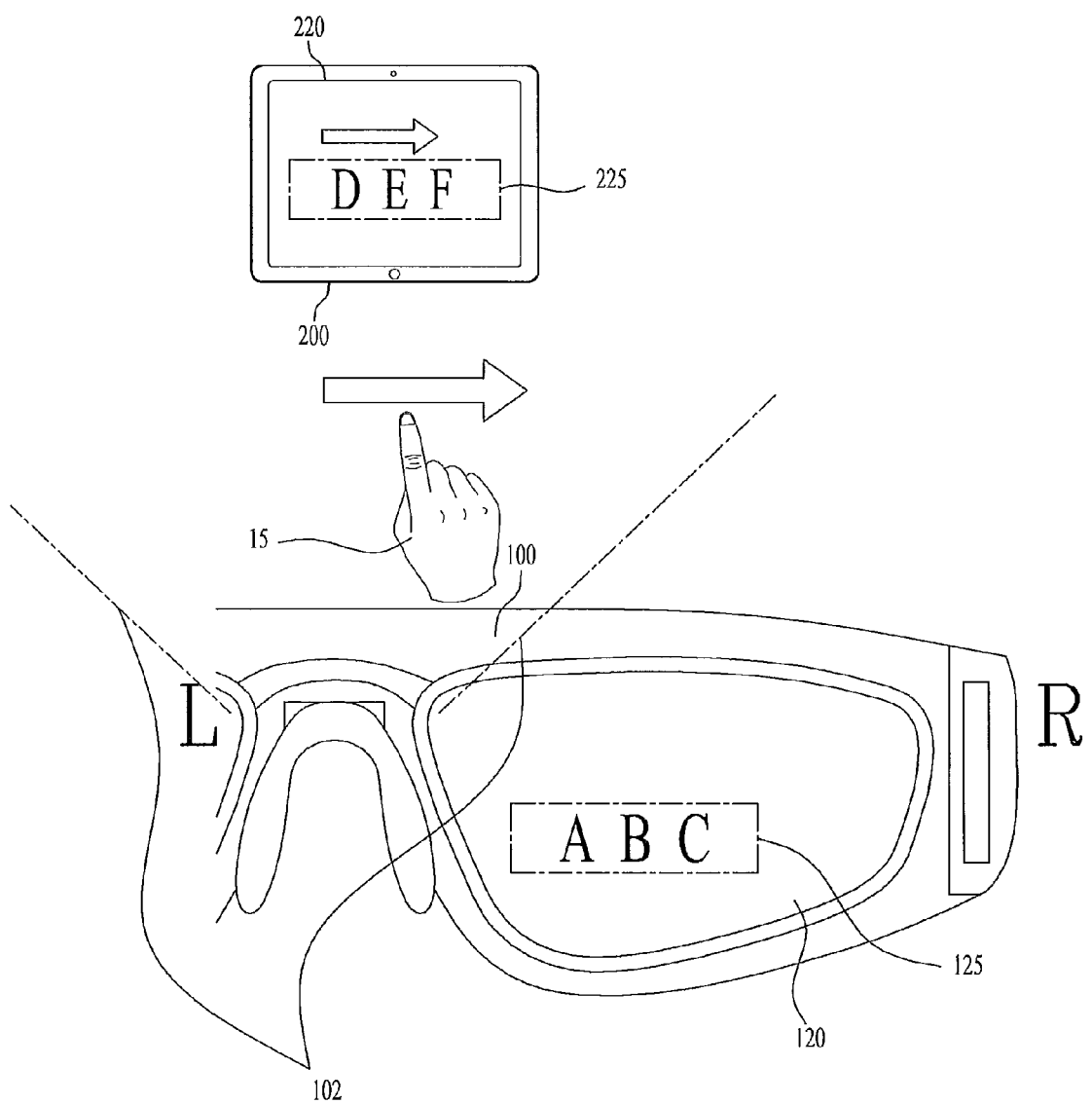
FIGS. 4 and 5 are views illustrating a control method of a digital device according to a third embodiment of the present invention.
Figure 5:
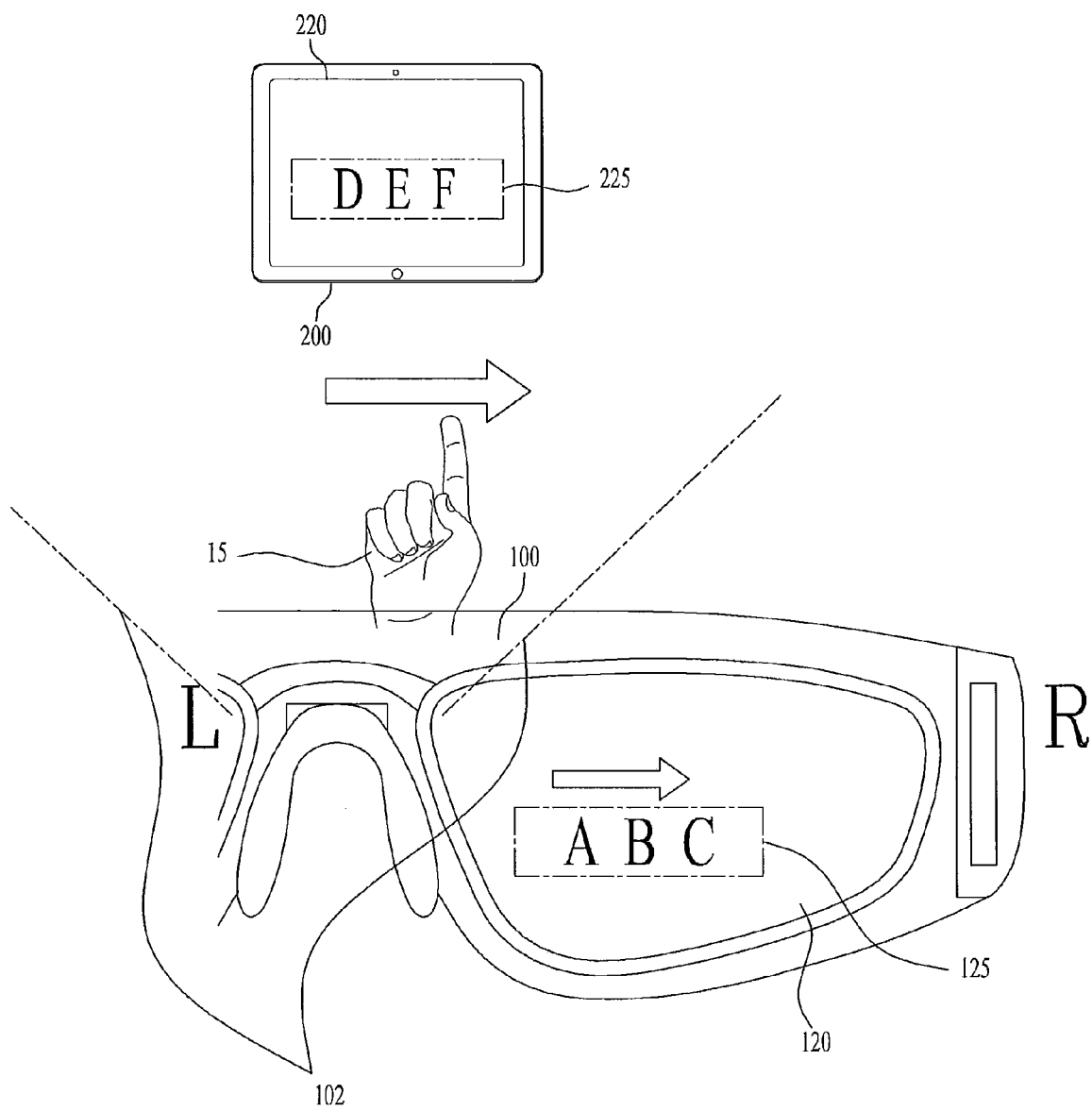

FIGS. 4 and 5 are views illustrating a control method of a digital device according to another embodiment of the present invention. In the embodiment of FIGS. 4 and 5, the HMD 100 is worn by the user 10, and the external digital device 200 linked with the HMD 100 is located within the view angle region 102 of the HMD 100.

First, the HMD 100 of the present invention detects the gesture input 15 of the user 10. Next, the HMD 100 may determine whether or not the external digital device 200 linked with the HMD 100 provides the same display object as the display object 125 of the HMD 100. If the external digital device 200 does not provide the same display object as the display object 125 of the HMD 100 as illustrated in the embodiment of FIGS. 4 and 5, the HMD 100 detects pointing direction information of the detected gesture input 15. In this case, the pointing direction information indicates a target digital device of the gesture input 15. According to an embodiment of the present invention, the pointing direction information may be derived from the direction indicated by the finger included in the gesture input 15. The HMD 100 according to the embodiment of the present invention may control a display object of a digital device that is pointed by the gesture input 15.

First, as illustrated in FIG. 4, if the pointing direction information of the detected gesture input 15 indicates the external digital device 200 located within the view angle region 102, the HMD 100 may control the display object 225 of the external digital device 200 using the detected gesture input 15 of the user. For example, in FIG. 4, the HMD 100 may detect the gesture input 15 that moves from the left side L of the HMD to the right side R of the HMD 100 within the view angle region 102. In this case, the pointing direction information of the gesture input 15 indicates the external digital device 200. The HMD 100 may control the display object 225 output on the display unit 220 of the external digital device 200 under application of the detected gesture input 15. That is, the HMD 100 may apply an input for movement from the left side to the right side with respect to the display object 225 of the external digital device 200. According to the embodiment of the present invention, the HMD 100 may transmit the detected gesture input 15 to the external digital device 200. The external digital device 200 may receive the gesture input 15 transmitted from the HMD 100, and control the display object 225 under application of the gesture input 15.

Alternatively, as illustrated in FIG. 5, if the pointing direction information of the detected gesture input 15 indicates the HMD 100, the HMD 100 may control the display object 125 of the HMD 100 using the detected gesture input 15 of the user. That is, in the embodiment of FIG. 5, if the HMD 100 detects the gesture input 15 that moves from the left side L of the HMD 100 to the right side R of the HMD 100 within the view angle region 102, the HMD 100 may apply an input for movement from the left side to the right side with respect to the display object 125 of the HMD 100.

According to the embodiment of FIGS. 4 and 5 as described above, if the external digital device 200 located within the view angle region 102 of the HMD 100 does not provide the same display object as the display object 125 of the HMD 100, the HMD 100 may determine a digital device to be controlled based on the pointing direction information of the detected gesture input 15. That is, the HMD 100 may control any one of the display objects 125 and 225 of the HMD 100 and the external digital device 200 based on the pointing direction information of the gesture input 15. In this case, the external digital device 200 and the HMD 100 linked with each other may have different platforms. That is, the display object 125 of the HMD 100 may be controlled by the HMD 100, and the display object 225 of the external digital device 200 may be controlled by the external digital device 200. As illustrated in the embodiment of FIG. 4, if the pointing direction information of the detected gesture input 15 indicates the external digital device 200 located within the view angle region 102, the HMD 100 may transmit the detected gesture input 15 to the external digital device 200. In this case, the HMD 100 of the present invention may serve as one of user input receiving devices of the external digital device 200.

Figure 6:
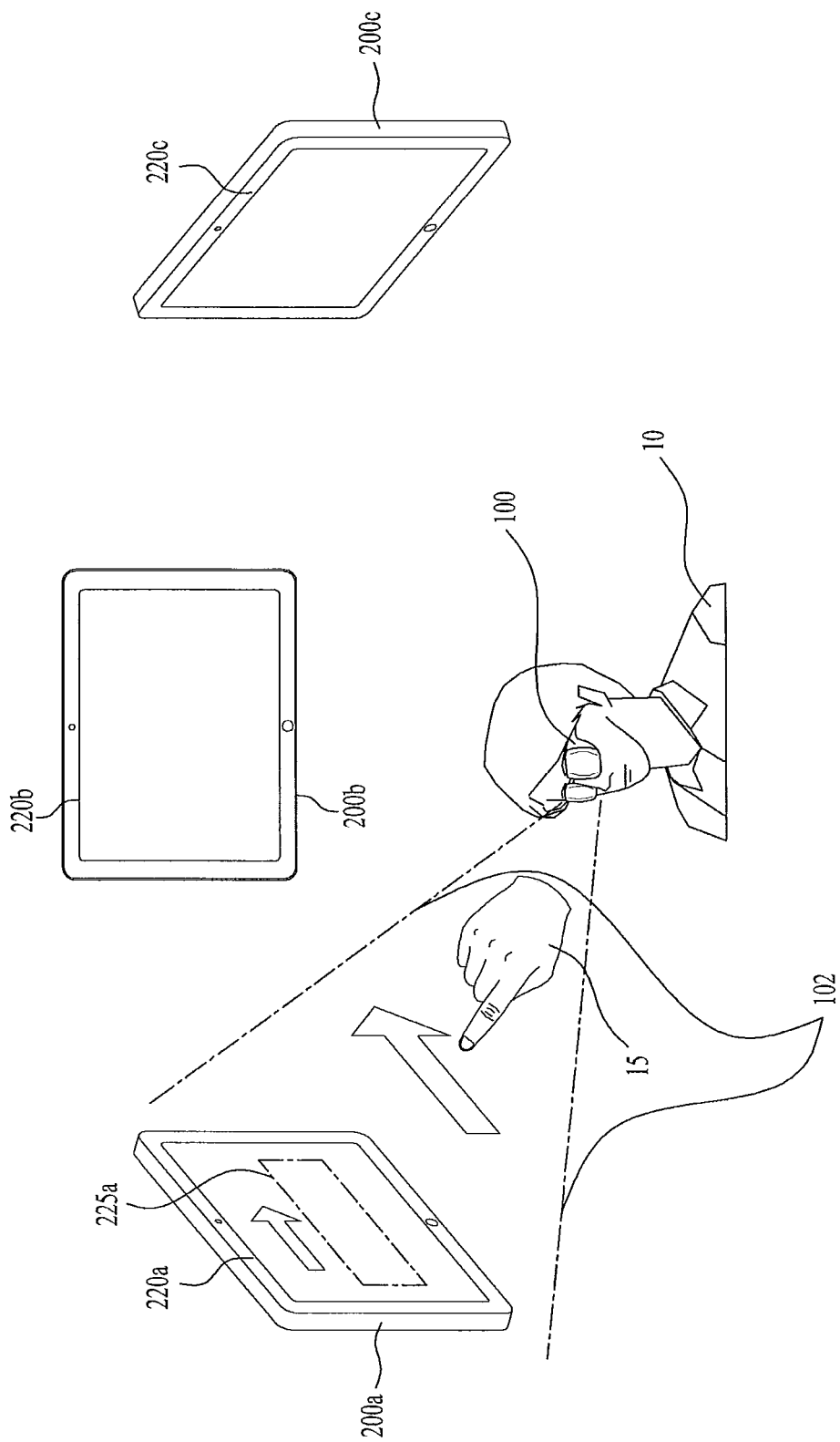
FIGS. 6 to 8 are views illustrating a method of controlling a plurality of external digital devices using an HMD according to an embodiment of the present invention.
Figure 7:
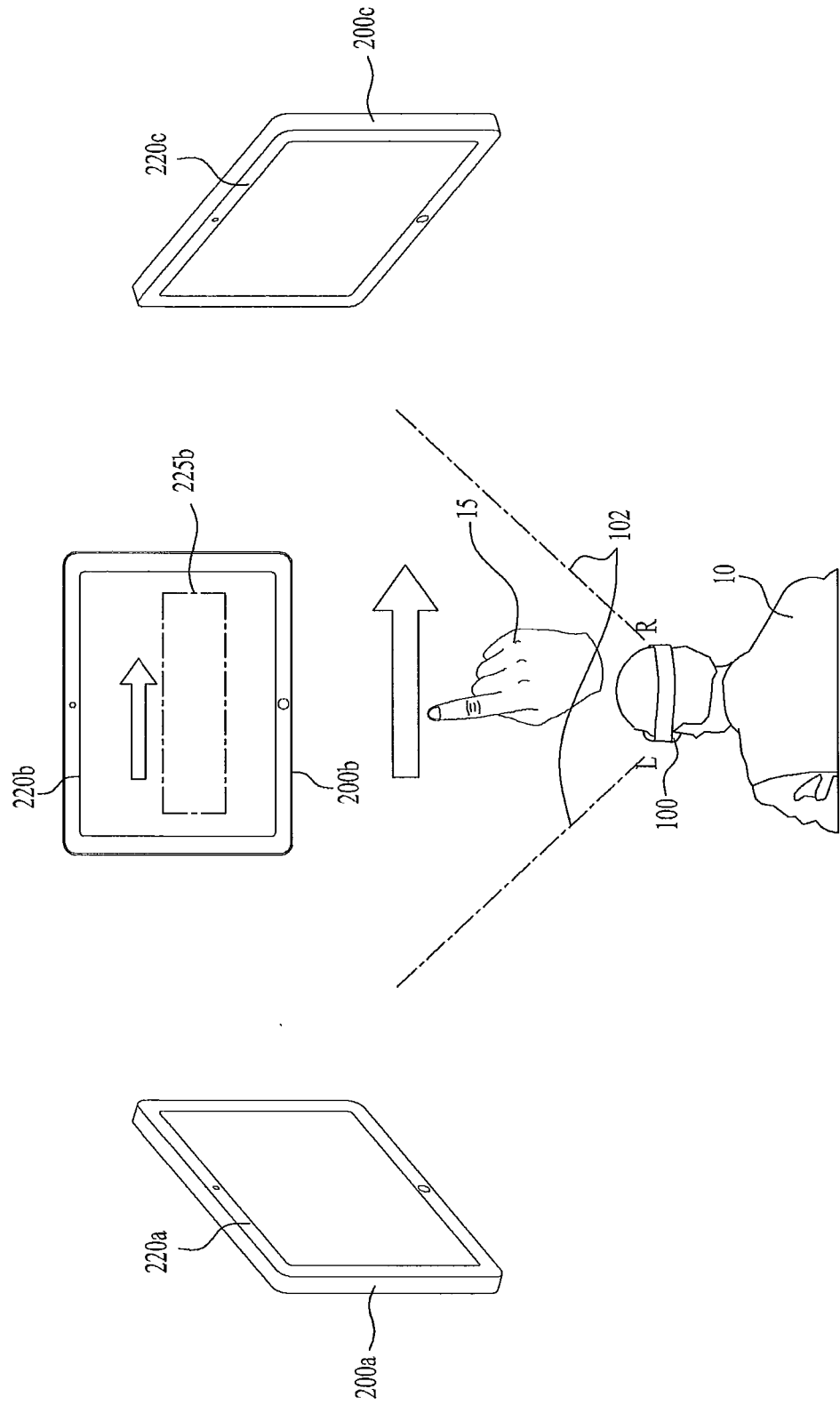
Figure 8:
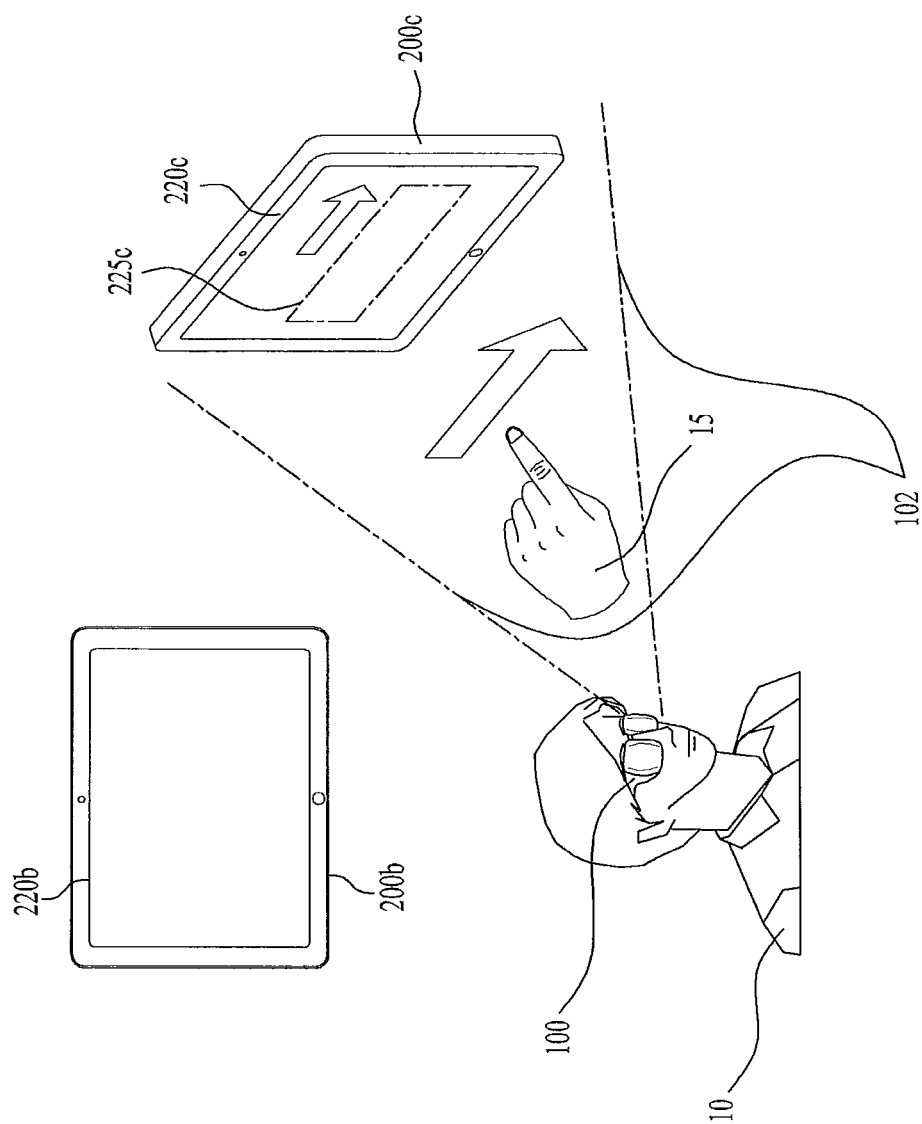

FIGS. 6 to 8 are views illustrating a method of controlling a plurality of external digital devices 200a, 200b and 200c using the HMD 100 according to an embodiment of the present invention. In FIGS. 6 to 8, the HMD 100 is worn by the user 10. The HMD 100 is linked with the plurality of external digital devices 200a, 200b and 200c, and the respective external digital devices 200a, 200b and 200c provide different display objects from the display object 125 of the HMD 100.

According to the embodiment of FIGS. 6 to 8, the HMD 100 may detect whether or not the respective external digital devices 200a, 200b and 200c are located within the view angle region 102, and control a display object of the corresponding external digital device located within the view angle region 102. That is, if any one external digital device linked with the HMD 100 is located within the view angle region 102 and the pointing direction information of the detected gesture input 15 indicates the corresponding external digital device located within the view angle region 102, the HMD 100 may control a display object of the corresponding external digital device using the detected gesture input 15.

For example, as illustrated in FIG. 6, if the external digital device 200a is located within the view angle region 102 of the HMD 100 and the pointing direction information of the gesture input 15 detected by the HMD 100 indicates the external digital device 200a, the HMD 100 may determine to control display of the external digital device 200a. That is, the HMD 100 may control a display object 225a output on a display unit 220a of the external digital device 200a under application of the detected gesture input 15. According to the embodiment of the present invention, the HMD 100 may transmit the detected gesture input 15 to the external digital device 200a. The external digital device 200a may receive the gesture input 15 transmitted from the HMD 100, and control the display object 225a using the gesture input 15.

As illustrated in FIG. 7, if the external digital device 200b is located within the view angle region 102 of the HMD 100 and the pointing direction information of the gesture input 15 detected by the HMD 100 indicates the external digital device 200b, the HMD 100 may determine to control display of the external digital device 200b. Likewise, as illustrated in FIG. 8, if the external digital device 200c is located within the view angle region 102 of the HMD 100 and the pointing direction information of the gesture input 15 detected by the HMD 100 indicates the external digital device 200c, the HMD 100 may determine to control display of the external digital device 200c. In relation to FIGS. 7 and 8, a method of controlling display objects 225b and 225c of the respective external digital devices 200b and 200c using the HMD 100 is equal to the above description with reference to FIG. 6.

According to the embodiment of the present invention, the display objects 225a, 225b and 225c of the plurality of external digital devices 200a, 200b and 200c may be controlled using the HMD 100. That is, the HMD 100 may detect whether or not the respective external digital devices 200a, 200b and 200c are located within the view angle region 102 of the HMD 100, and control the respective external digital devices 200a, 200b and 200c based on the detected results. In a state of wearing the HMD 100 according to the embodiment of the present invention, the user 10 can perform a control input with respect to the display object of the external digital device that the user 10 wishes to control by performing the gesture input 15 while looking at the corresponding external digital device.

Figure 9:
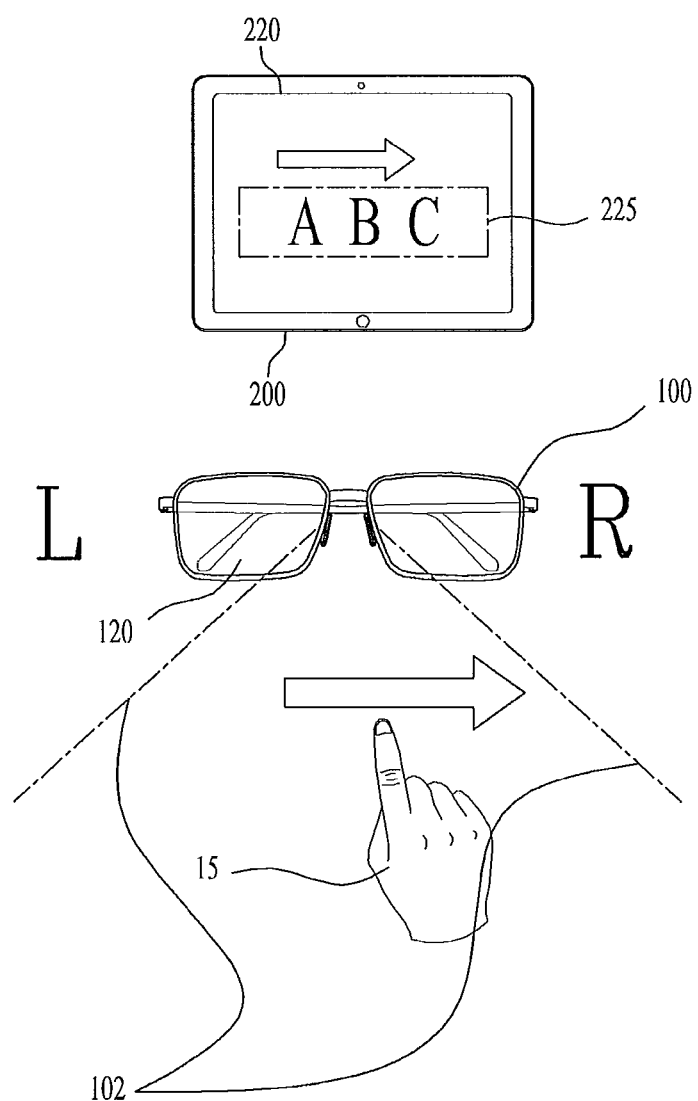
FIGS. 9 and 10 are views illustrating a control method of a digital device according to a fourth embodiment of the present invention.
Figure 10:
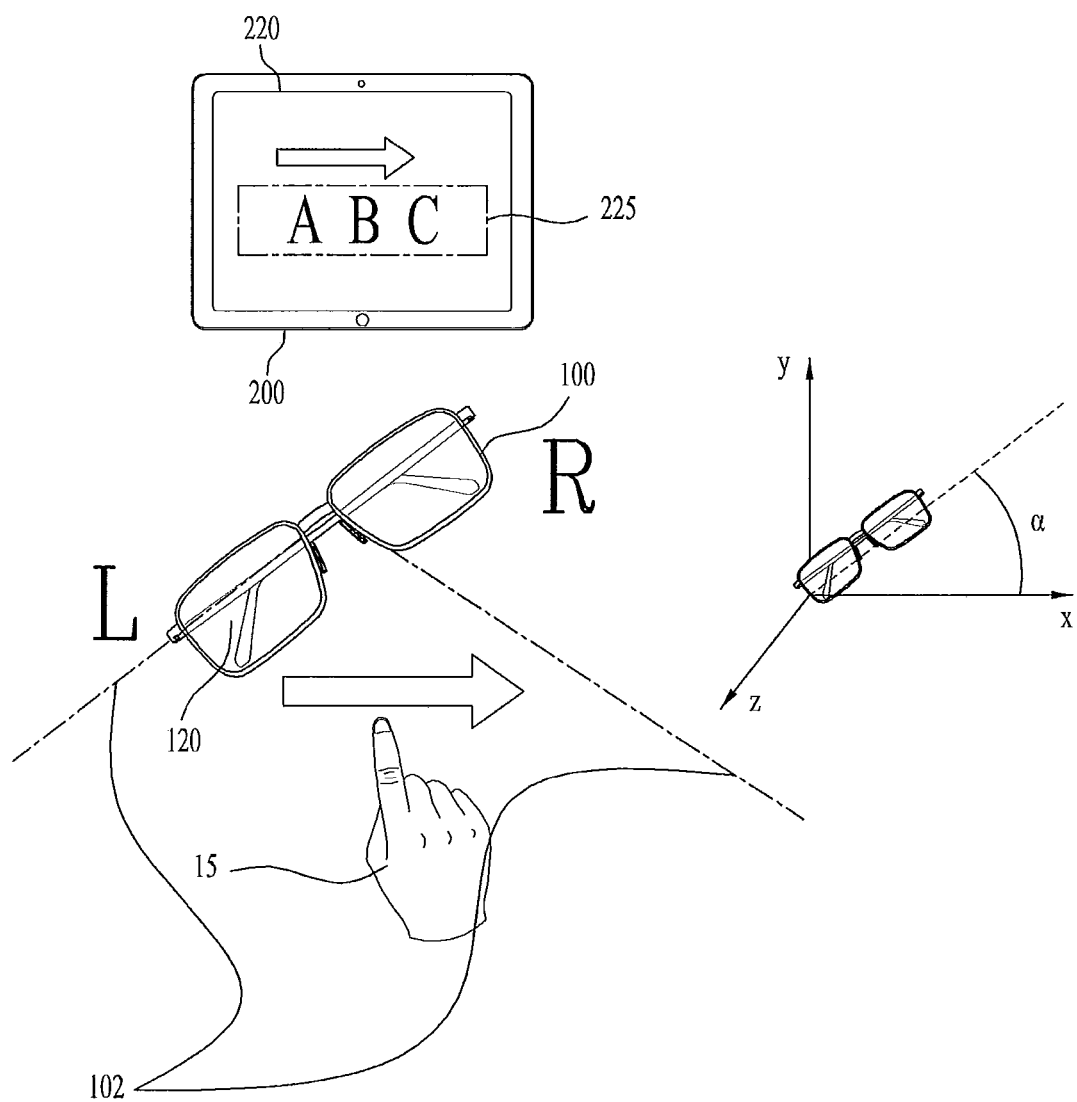

FIGS. 9 and 10 are views illustrating a control method of a digital device according to another embodiment of the present invention. In the embodiment of FIGS. 9 and 10, the HMD 100 is not worn by the user 10.

First, referring to FIG. 9, the HMD 100 may detect the gesture input 15 of the user 10, and control the display object 225 of the external digital device 200 using the detected gesture input 15. That is, according to the embodiment of the present invention, if the HMD 100 is not worn by the user 10, the HMD 100 may determine to control display of the external digital device 200 using the detected gesture input 15. Accordingly, the external digital device 200 may utilize the HMD 100 of the present invention as a user input receiving device.

Meanwhile, according to the embodiment of the present invention, the HMD 100 may correct an application direction of the gesture input 15 with respect to the display object 225 of the external digital device 200 based on whether or not the HMD 10 is worn by the user. That is, if the HMD 10 of the present invention is not worn by the user, the HMD 100 may reverse left and right sides of a gesture input application direction with respect to the display object 225. Here, the gesture input application direction corresponds to a movement direction of the detected gesture input 15. For example, as illustrated in FIG. 9, if the gesture input 15 of the user 10 is performed within the view angle region 102 of the HMD 100, the HMD 100 detects the gesture input 15. The gesture input 15 is an input for movement from the right side R to the left side L of the HMD 100. In this case, the HMD 100 controls the display object 225 by reversing left and right sides of the detected gesture input 15. Thereby, the HMD 100 may apply an input for movement from the left side to the right side with respect to the display object 225 of the external digital device 200. This may assist the user in more conveniently and easily performing the gesture input 15 with respect to the external digital device 200 using the HMD 100.

According to the embodiment of the present invention, the HMD 100 may transmit the detected gesture input 15 to the external digital device 200. In this case, the HMD 100 may reverse left and right sides of the detected gesture input 15 prior to transmitting the gesture input 15 to the external digital device 200. The external digital device 200 may receive the left-to-right reversed gesture input 15 transmitted from the HMD 100, and apply the received gesture input 15 to the display object 225. Alternatively, in addition to the detected gesture input 15, the HMD 100 may transmit additional information on the state of the HMD 100 that detects the gesture input 15. For example, the additional information may include information on whether or not the HMD 100 that detects the gesture input 15 is worn by the user 10. If the additional information indicating that the HMD 100 is not worn by the user 10 is transmitted to the external digital device 200, the external digital device 200 may reverse the left and right sides of the gesture input 15 transmitted from the HMD 100, and then apply the reversed gesture input 15 to the display object 225. In this way, the external digital device 200 may reverse the left and right sides of the gesture input 15 initially detected by the HMD 100, and then apply the resulting gesture input 15 to the display object 225, which may allow the display object 225 to be controlled to conform to the user's intentions.

Next, FIG. 10 illustrates another embodiment of a method of controlling a digital device when the HMD 100 is not worn by the user 10. According to the embodiment of the present invention, the HMD 100 may include a sensor for sensing an orientation angle of the HMD 100, such as, for example, a G-sensor or a gyroscope sensor. Thus, the HMD 100 may sense a tilt angle of the HMD 100 on the basis of the ground, i.e. the orientation angle of the HMD 100. In this case, the HMD 100 may sense the orientation angle of the HMD 100 on the basis of at least one axis of X-axis, Y-axis and Z-axis perpendicular to one another. The HMD 100 of the present invention may correct the detected gesture input 15 of the user using the orientation angle of the HMD 100.

For example, as illustrated in FIG. 10, the HMD 100 may detect the gesture input 15 of the user in a state in which the HMD 100 is tilted by an angle α on the basis of the X-axis. Thus, despite that the user performs a horizontal gesture input, the HMD 100 may recognize a gesture input that moves from the right upper side of the HMD 100 to the left lower side of the HMD 100. In this case, the HMD 100 of the present invention may correct the detected gesture input 15 using the orientation angle of the HMD 100, and apply the corrected gesture input 15 to the display object 225. For example, the HMD 100 may add or subtract the tilt angle α to or from the detected gesture input 15. Preferably, the HMD 100 may correct the detected gesture input 15 by reversing the left and right sides of the gesture input 15 and adding the orientation angle α of the HMD 100 to the gesture input 15. As such, the HMD 100 may apply an input for movement from the left side to the right side with respect to the display object 225. In this way, the external digital device 200 may receive the gesture input 15 of the user under the same condition regardless of the orientation angle of the HMD 100.

According to the embodiment of the present invention, the HMD 100 may transmit the detected gesture input 15 to the external digital device 200. In this case, the HMD 100 may transmit the gesture input 15, which has been corrected using the orientation angle of the HMD 100, to the external digital device 200. The external digital device 200 may receive the corrected gesture input 15 from the HMD 100, and apply the received gesture input 15 to the display object 225. Alternatively, in addition to the detected gesture input 15, the HMD 100 may transmit additional information on the state of the HMD that detects the gesture input. For example, the additional information may include information on whether or not the HMD 100 that detects the gesture input 15 is worn by the user and information on the orientation angle of the HMD 100. The external digital device 200 may correct the gesture input 15 transmitted from the HMD 100 using the additional information, and apply the corrected gesture input 15 to the display object 225.

Figure 11:
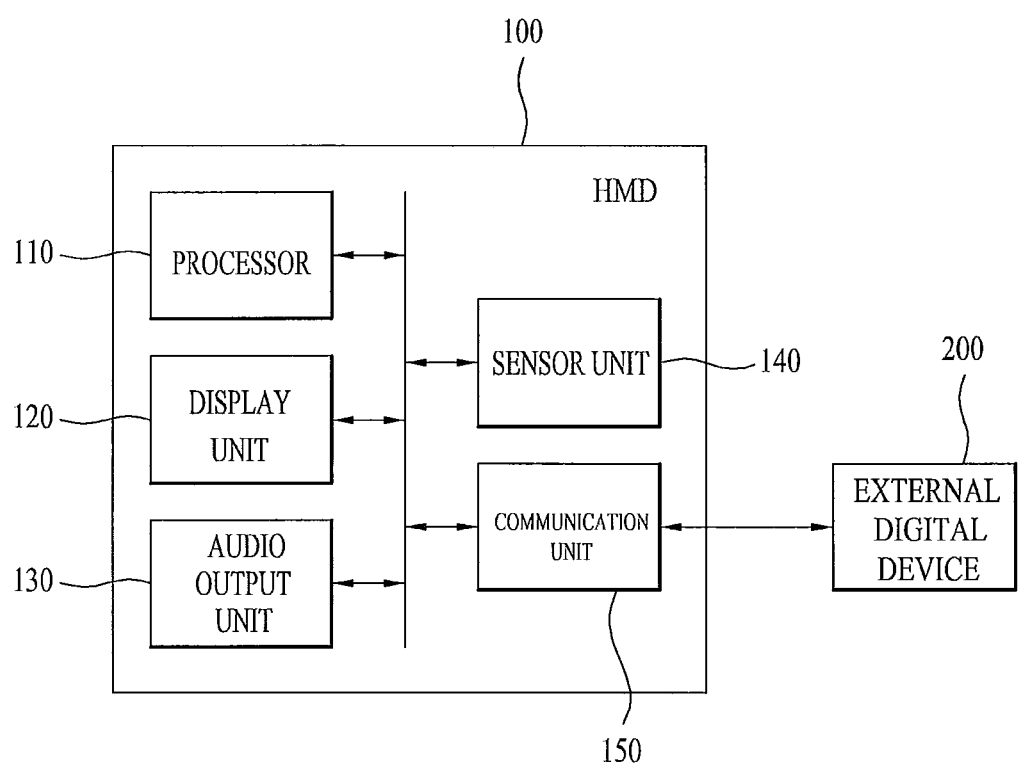
FIG. 11 is a block diagram illustrating an HMD according to an embodiment of the present invention.

FIG. 11 is a block diagram illustrating the HMD according to an embodiment of the present invention.

Referring to FIG. 11, the HMD 100 of the present invention may include a processor 110, a display unit 120, an audio output unit 130, a sensor unit 140 and a communication unit 150.

First, the display unit 120 outputs an image on a display screen. The display unit 120 may output various display objects including content executed by the processor 110 or a user interface based on a control command of the processor 110, for example. According to an alternative embodiment of the present invention, the display unit 120 may display an image based on a control command of a digital device linked with the HMD 100 (for example, the external digital device 200 of the present invention). For example, the display unit 120 may display content executed by the digital device linked with the HMD 100. The HMD 100 may receive data from the digital device through the communication unit 150, and output a display object based on the received data. According to the embodiment of the present invention, the display unit 120 of the HMD 100 and the display unit of the external digital device 200 may provide the same display object, or may provide different display objects. If the HMD 100 and the external digital device 200 are in an N-screen state in which they are linked with each other, the display unit 120 of the HMD 100 and the display unit of the external digital device 200 may provide the same display object. However, if the HMD 100 and the external digital device 200 are not in an N-screen state or have different platforms, the display unit 120 of the HMD 100 and the display unit of the external digital device 200 may provide different display objects.

Next, the audio output unit 130 includes various audio output means, such as, for example, a speaker and earphone. Likewise, the audio output unit 130 may output content executed by the processor 110, or may output voice based on a control command of the processor 110. Additionally, according to the embodiment of the present invention, the audio output unit 130 may output voice based on a control command of the digital device linked with the HMD 100. For example, the audio output unit 130 may output voice data of content executed by the digital device linked with the HMD 100. In the present invention, the audio output unit 130 may be selectively provided on the HMD 100.

The sensor unit 140 may transmit a user input or an environment recognized by the HMD 100 to the processor 110 using a plurality of sensors equipped in the HMD 100. In this case, the sensor unit 150 may include a plurality of sensing means. In an embodiment, the plurality of sensing means may include a gravity sensor, a geomagnetic sensor, a motion sensor, a kinetic sensor, a gyroscope sensor, an accelerometer, an infrared sensor, an inclination sensor, an illumination sensor, a height sensor, an olfactory sensor, a temperature sensor, a depth sensor, a pressure sensor, a bending sensor, an audio sensor, a video sensor, a Global Positioning System (GPS) sensor, a touch sensor, and a proximity sensor, for example. The sensor unit 150 is a generic term of the above enumerated various sensing means, and may sense various user inputs and user environments, and transmit the sensed results to the processor 110 so as to assist the processor 110 in performing corresponding operations. The above enumerated sensors may be provided as individual elements included in the HMD 100, or may be combined to constitute at least one element included in the HMD 100.

According to an embodiment of the present invention, the sensor unit 140 may include various kinds of sensors to detect whether or not the HMD 100 is worn by the user. For example, the HMD 100 may detect whether or not the HMD 100 is worn by the user using a proximity sensor. Alternatively, the HMD 100 may include a sensor that detects whether or not a hinge, configured to connect a front portion and a leg portion of the HMD 100 to each other, is folded. As such, the HMD 100 may determine whether or not the HMD 100 is worn by the user based on the folded or unfolded state of the hinge.

Additionally, according to an embodiment of the present invention, the sensor unit 140 may include a sensor to detect a gesture input of the user. For example, the HMD 100 may include a kinetic sensor that detects a gesture input of the user within a preset angular range forward of the HMD 100. Alternatively, the HMD may include a sensor to detect motion of a glove for the gesture input. For example, the HMD 100 may detect information on the position and direction of a glove in a 3-dimensional space, and information on the bending of the finger. In this case, the user may perform a gesture input with the hand wearing the glove, and the HMD 100 may detect the gesture input of the user via motion of the glove.

According to another embodiment of the present invention, the sensor unit 140 may include an image capturing sensor. The image capturing sensor may detect an image within a preset view angle region of the HMD 100, and provide the detected image to the processor 110. According to an embodiment of the present invention, the processor 110 may detect whether the external digital device 200 linked with the HMD 100 is present within the view angle region of the HMD 100 based on the image detected via the image capturing sensor. The image capturing sensor may be replaced by an infrared sensor according to the purpose of the present invention.

The communication unit 150 may perform data transmission/reception via communication with the external digital device 200 using a variety of protocols. The communication unit 150 may be connected to a wired or wireless network for transmission/reception of digital data, such as content, for example. In the present invention, the HMD 100 may perform paring and communication connection with the external digital device 200 using the communication unit 150, and may perform data transmission/reception with the connected external digital device 200. According to an embodiment of the present invention, the communication unit 150 may include at least one antenna. The HMD 100 may detect a positional state of the external digital device 200 linked with the HMD 100 using the at least one antenna. For example, the HMD 100 may detect whether or not the external digital device 200 linked with the HMD 100 is located within the view angle region of the HMD 100 using, for example, a time difference or phase difference of signals transmitted/received through a plurality of antennas equipped in the HMD 100.

The processor 110 of the present invention may execute various content and applications, and process internal data of the digital device. Additionally, the processor 110 may control the above described respective units of the HMD 100, and control data transmission/reception between the units.

FIG. 11 is a block diagram of the HMD 100 according to the embodiment of the present invention, and separately displayed blocks represent logically distinguished elements of the device. Accordingly, the elements of the above described device may be mounted in a single chip or in a plurality of chips according to a device design.

Figure 12:
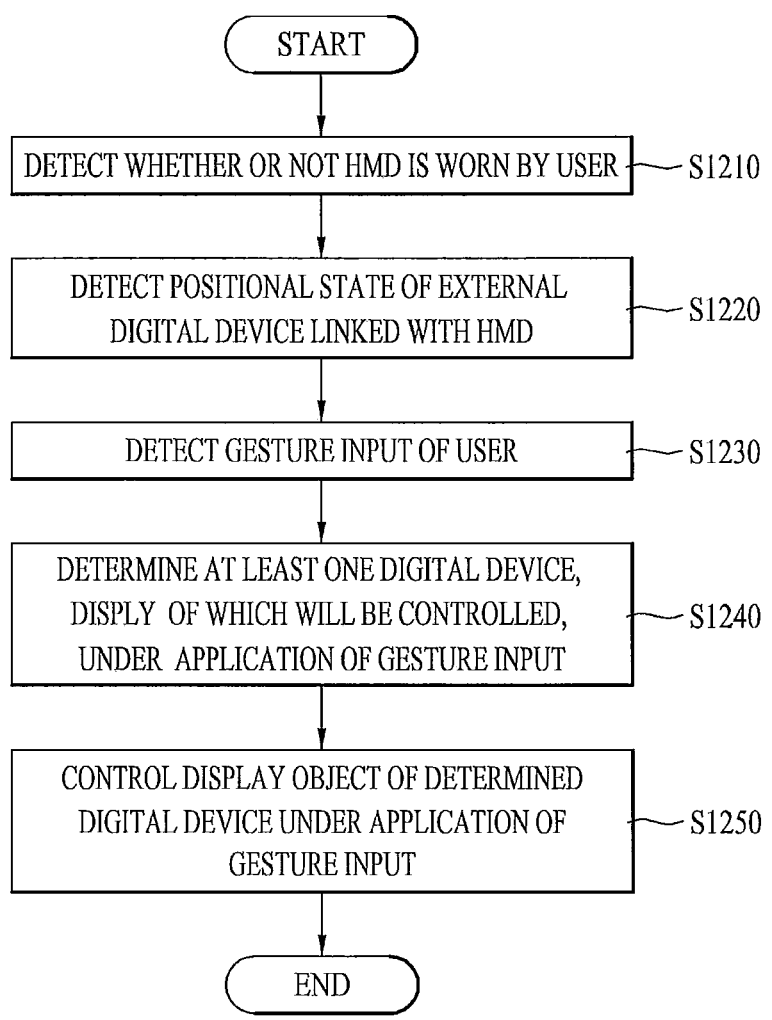
FIG. 12 is a flowchart illustrating a control method of a digital device using an HMD according to an embodiment of the present invention.

FIG. 12 is a flowchart illustrating a control method of a digital device using the HMD according to an embodiment of the present invention. In the following description, respective operations of FIG. 12 may be controlled by the processor 110 of the HMD 100 illustrated in FIG. 11.

First, the HMD of the present invention may detect whether or not the HMD is worn by the user (S1210). To this end, the HMD may detect whether or not the HMD is worn by the user using a variety of sensing means. For example, the HMD may include a proximity sensor to detect whether or not the HMD is worn by the user. Alternatively, the HMD may include a sensor to detect whether or not the hinge, used to connect the front portion and the leg portion of the HMD to each other, is folded. As such, the HMD may determine whether or not the HMD is worn by the user based on the folded or unfolded state of the hinge.

Next, the HMD of the present invention detects a positional state of an external digital device linked with the HMD (S1220). In the present invention, the positional state includes a first state in which the external digital device is located in a preset view angle region of the HMD, and a second state in which the external digital device is not located in the view angle region of the HMD. In the present invention, the view angle region is a preset region corresponding to a visual field of the user who wears the HMD, and may include a region forward of the HMD within a predetermined angular range.

According to an embodiment of the present invention, the HMD may detect the positional state of the external digital device using at least one antenna. For example, the HMD may include a plurality of antennas, and perform data transmission/reception with the external digital device through the plurality of antennas. In this case, the HMD may detect relative positions and directions between the HMD and the external digital device linked with the HMD using, for example, a time difference or phase difference of signals transmitted/received through the plurality of antennas equipped in the HMD. According to the embodiment of the present invention, through use of the plurality of antennas equipped in the HMD, the positional state of the external digital device may be accurately detected even in a situation in which a constant distance between the external digital device and the HMD is maintained and the direction (orientation angle) of the external digital device is changed. According to another embodiment of the present invention, the HMD may include a directional antenna, and detect the positional state of the external digital device using a signal transmitted/received through the directional antenna.

According to another embodiment of the present invention, the HMD may detect the positional state of the external digital device using an image capturing sensor. That is, in a state in which the HMD is linked with the external digital device, the image capturing sensor may detect an image within a preset view angle region and provide the detected image to the processor of the HMD. The processor may detect whether the external digital device linked with the HMD is present within the view angle region of the HMD based on the image detected by the image capturing sensor. For example, the external digital device linked with the HMD may output a preset optical pattern, and the HMD may detect the optical pattern output from the external digital device using the image capturing sensor. Here, the optical pattern may include at least one of a temporal pattern and a spatial pattern. According to an embodiment of the present invention, the optical pattern may be output through the display unit of the external digital device.

If the external digital device linked with the HMD is present within the view angle region of the HMD, the HMD may detect the optical pattern output from the external digital device using the image capturing sensor. However, if the external digital device linked with the HMD is not present within the view angle region of the HMD, the image capturing sensor cannot detect the optical pattern output from the external digital device. Meanwhile, according to an embodiment of the present invention, even if the optical pattern is output through the display unit of the external digital device and the external digital device is within the view angle region of the HMD, the optical pattern cannot be detected when the display unit of the corresponding external digital device does not face the user. That is, in a situation in which the user cannot look at the display unit of the external digital device, the HMD may fail to detect the optical pattern. As described above, the HMD of the present invention may detect the positional state of the external digital device based on whether or not the optical pattern of the external digital device within the view angle region is detected.

According to another embodiment of the present invention, the positional state of the external digital device may be determined based on the eyes of the user who wears the HMD. The HMD of the present invention may further include an image capturing sensor to detect positions of pupils of the user who wears the HMD, and may track the user's eyes using the image capturing sensor. As such, the positional state of the external digital device of the present invention may be determined based on whether or not the external digital device is located within the visual field of the user who wears the HMD. Here, the visual field may include a predetermined range corresponding to the eyes of the user who wears the HMD. That is, in the present invention, the positional state of the external digital device may include a third state in which the external digital device is located in the visual field of the user who wears the HMD and a fourth state in which the external digital device is not located in the visual field of the user who wears the HMD.

According to the embodiment of the present invention, when the positional state of the external digital device is changed, the HMD may provide appropriate feedback. For example, if the positional state of the external digital device linked with the HMD is changed from a first state to a second state, the HMD may provide vibration feedback. Likewise, if the positional state of the external digital device linked with the HMD is changed from a third state to a fourth state, the HMD may provide vibration feedback.

Next, the HMD of the present invention detects a gesture input of the user (S1230). The HMD of the present invention may include a variety of sensing means to detect the gesture input of the user, such as, for example, a kinetic sensor. Alternatively, the HMD may include a sensor to detect motion of a glove for the gesture input. For example, the HMD may detect information on the position and direction of the glove in a 3-dimensional space, and information on the bending of the finger. In this case, the user may perform a gesture input with the hand wearing the glove, and the HMD may detect the gesture input of the user via motion of the glove. As such, the HMD may detect the gesture input of the user within a preset angular range forward of the HMD. According to another embodiment of the present invention, the external digital device linked with the HMD may detect a gesture input of the user, and the HMD may receive the gesture input detected by the corresponding external digital device.

Next, the HMD of the present invention may determine at least one digital device, display of which will be controlled, under application of the gesture input (S1240). In this case, the at least one digital device includes at least one of the HMD and the external digital device of the present invention. According to the embodiment of the present invention, the HMD may determine a digital device, display of which will be controlled, based on the detected environment and preset conditions of the HMD. For example, the HMD may determine the digital device, display of which will be controlled, based on the result with regard to whether or not the HMD is worn by the user (S1210) and based on the detected positional state of the external digital device (S1220). Additionally, the HMD may further determine whether or not the HMD and the external digital device provide the same display object, and may determine the digital device, display of which will be controlled, based on the determined result.

Next, the HMD of the present invention controls the display object of the digital device determined in Operation S1240 using the gesture input detected in Operation S1230 (S1250). The HMD according to the embodiment of the present invention may control at least one of the display object of the HMD and the display object of the external digital device based on the result of Operation S1240. According to the embodiment of the present invention, if the HMD is not worn by the user, the HMD may correct the detected gesture input, and control display object using the corrected gesture input. Also, according to the embodiment of the present invention, if the external digital device provides a different display object from the display object of the HMD and the HMD determines to control display of the external digital device using the gesture input, the HMD may transmit the detected gesture input to the corresponding external digital device. Details of Operations S1240 and S1250 of the present invention are equal to the above description with reference to FIGS. 2 to 10.

The HMD described herein may be altered to or replaced by a variety of devices according to purposes thereof. For example, the HMD of the present invention may include various other devices that can be worn by the user and provide a display function, such as, for example, an Eye Mounted Display (EMD), eyeglass, eyepiece, eye-wear, and Head Worn Display (HWD), and are not limited to the terms used herein.

As is apparent from the above description, with a control method of a digital device according to an embodiment of the present invention, display of a plurality of digital devices may be controlled using an HMD.

In particular, according to an embodiment of the present invention, the user can control a display object of an external digital device linked with the HMD as well as a display object of the HMD using the HMD.

According to an embodiment of the present invention, it is possible to grasp a user's intention in that the user wishes to control a display object of any one digital device among a plurality of external digital devices, and to provide a simplified and intuitive user interface to assist the user in controlling the display object of the corresponding digital device to conform to the user's intention.

According to an embodiment of the present invention, it is possible to determine whether or not to reverse a gesture input of a user and whether or not to correct the gesture input based on whether or not the HMD is worn by the user. Accordingly, according to an embodiment of the present invention, it is possible to determine an application direction of the gesture input on the basis of the user who performs the gesture input regardless of different states of the HMD.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A control method of a digital device using a Head Mounted Display (HMD) and an external digital device, the HMD displaying a first display object and the external digital device displaying a second display object independent and different from the first display object, the method comprising:
   determining whether the HMD is linked with the external digital device;
   detecting a positional state of the external digital device linked with the HMD, wherein the positional state includes a first state in which the external digital device is located in a predetermined view angle region of the HMD and a second state in which the external digital device is located outside of the predetermined view angle region of the HMD when the HMD is linked with the external device;
   detecting a gesture input of a user when the external digital device is in the first state, wherein the gesture input is located between the first display object displayed on the HMD and the second display object displayed on the external digital device;
   while the first and second display objects are being displayed and are seen by the user respectively on the HMD and the external digital device, determining whether the second display object shown to the user on the external digital device is different from the first display object being displayed on the HMD;
   detecting a pointing direction of the gesture if the second display object being displayed and shown to the user on the external digital device is different from the first display object being displayed on the HMD;
   while the HMD and the external digital device are displaying respectively the first display object and the second display object which is shown to the user and is different from the first display object, determining which one of the HMD and the external digital device is to be a control device which is to be controlled by the gesture input based on the pointing direction of the gesture input,
   wherein if the pointing direction of the gesture input points toward the HMD, the HMD is determined to be the control device, and if the pointing direction of the gesture input points toward the external digital device, the external digital device is determined to be the control device; and
   controlling the first display object displayed on the HMD based on the gesture input when the HMD is determined to be the control device or controlling the second display object displayed on the external digital device based on the gesture input when the external digital device is determined to be the control device,
   wherein during the controlling of the first or the second display object, the HMD and the external digital device are displaying respectively the first display object and the second display object which is shown to the user and is different from the first display object.

2. The control method according to claim 1, wherein, when the external digital device is determined to be the control device, the step of controlling the second display object includes transmitting, by the HMD, the detected gesture input to the external digital device.

3. The control method according to claim 1, wherein, the detecting the positional state of the external digital device includes detecting the positional state of the external digital device using signals transmitted/received with the external digital device through at least one antenna equipped in the HMD.

4. The control method according to claim 1, wherein the detecting the positional state of the external digital device includes detecting the positional state of the external digital device based on whether or not an optical pattern output from the external digital device is detected.

5. The control method according to claim 1, wherein the position state of the external digital device includes a third state in which the external digital device is located in a visual field of the user wearing the HMD and a fourth state in which the external digital device is not located in the visual field of the user wearing the HMD.

6. The control method according to claim 1, wherein if the detected positional state of the external digital device is changed between the first state and the second state, the HMD provides a vibration feedback.

7. The control method according to claim 1, wherein the detecting the gesture input of the user includes detecting the gesture input of the user using a sensed value of a kinetic sensor equipped in the HMD.

8. The control method according to claim 1, wherein the predetermined view angle region is a region forward of the HMD within a predetermined angular range.

9. The control method according to claim 1, wherein the second display object shown to the user and the first display object are from two different and independent image sources, respectively.

10. The control method according to claim 1, wherein the first display object includes no portion of the second display object shown to the user.

11. The control method according to claim 1, wherein the second display object shown to the user and the first display object are from two different and independent image sources, respectively, and the first display object includes no portion of the second display object shown to the user.

12. The control method according to claim 1, wherein the second display object shown to the user is entirely different from the first display object.

13. The control method according to claim 1, wherein the external digital device is determined to be in the first state, if the external digital device currently displaying the first display object on a physical screen of the external digital device is visibly located in the predetermined viewing angle region of the HMD currently displaying the second display object thereon, where both the first and second display objects currently and respectively displayed on the external digital device and the HMD are visible to the user at a same time.

14. A Head Mounted Display (HMD) comprising:
   a processor configured to control operation of the HMD;
   a display unit configured to output an image based on a command of the processor;
   a sensor unit configured to sense a peripheral environment of the HMD and transmit the sensed result to the processor; and
   a communication unit configured to perform data transmission/reception with an external digital device based on a command of the processor,
   wherein the processor is configured to implement a control method between the HMD and the external digital device, the HMD displaying a first display object on the display unit and the external digital device displaying a second display object independent and different from the first display object, and
   wherein the processor is further configured to:

determine whether the HMD is linked with the external digital device;

detect a positional state of the external digital device linked with the HMD, wherein the positional state includes a first state in which the external digital device is located in a predetermined view angle region of the HMD and a second state in which the external digital device is located outside of the predetermined view angle region of the HMD when the HMD is linked with the external digital device;

detect a gesture input of a user when the external digital device is detected to be in the first state, wherein the gesture input is located between the first display object displayed on the HMD and the second display object displayed on the external digital device;

while the first and second display objects are being displayed and are seen by the user respectively on the HMD and the external digital device, determine whether the second display object shown to the user on the external digital device is different from the first display object being displayed on the HMD;

detect a pointing direction of the gesture if the second display object being displayed and shown to the user on the external digital device is different from the first display object being displayed on the HMD;

while the HMD and the external digital device are displaying respectively the first display object and the second display object which is shown to the user and is different from the first display object, determine which one of the HMD and the external digital device is to be a control device which is to be controlled based on the pointing direction of the gesture input, wherein if the pointing direction of the gesture input points toward the HMD, the HMD is determined to be the control device, and if the pointing direction of the gesture input points toward the external digital device, the external digital device is determined to be the control device; and control the first display object displayed on the HMD based on the gesture input when the HMD is determined to be the control device or control the second display object displayed on the external digital device based on the gesture input when the external digital device is determined to be the control device, wherein during the controlling of the first or the second display object, the HMD and the external digital device are displaying respectively the first display object and the second display object which is shown to the user and is different from the first display object.

15. The HMD according to claim 14, wherein the processor is further configured to transmit the detected gesture input to the external digital device, when the external digital device is determined to be the control device.

16. The HMD according to claim 14, wherein the processor is further configured to detect the positional state of the external digital device using signals transmitted/received with the external digital device through at least one antenna equipped in the HMD.

17. The HMD according to claim 14, wherein the processor is further configured to detect the positional state of the external digital device based on whether or not an optical pattern output from the external digital device is detected.

18. The HMD according to claim 14, wherein the position state of the external digital device includes a third state in which the external digital device is located in a visual field of the user wearing the HMD and a fourth state in which the external digital device is not located in the visual field of the user wearing the HMD.

19. The HMD according to claim 14, wherein the processor is further configured to provide a vibration feedback, if the detected positional state of the external digital device is changed between the first state and the second state.

20. The HMD according to claim 14, wherein the processor is further configured to detect the gesture input of the user using a sensed value of a kinetic sensor equipped in the HMD.

21. The HMD according to claim 14, wherein the predetermined view angle region is a region forward of the HMD within a predetermined angular range.

22. The HMD according to claim 14, wherein the second display object shown to the user and the first display object are from two different and independent image sources, respectively.

23. The HMD according to claim 14, wherein the first display object includes no portion of the second display object shown to the user.

24. The HMD according to claim 14, wherein the second display object shown to the user and the first display object are from two different and independent image sources, respectively, and the first display object includes no portion of the second display object shown to the user.

25. The HMD according to claim 14, wherein the second display object shown to the user is entirely different from the first display object.

26. The HMD according to claim 14, wherein the external digital device is determined to be in the first state, if the external digital device currently displaying the first display object on a physical screen of the external digital device is visibly located in the predetermined viewing angle region of the HMD currently displaying the second display object thereon, where both the first and second display objects currently and respectively displayed on the external digital device and the HMD are visible to the user at a same time.

* * * * *